United States Patent [19]

Liaw et al.

[11] Patent Number: 5,773,076
[45] Date of Patent: Jun. 30, 1998

[54] PROCESS FOR RECOVERY OF INSOLUBLE PROTEIN FROM STEEP WATER

[75] Inventors: Gin C. Liaw; Eric H. Lutz, both of Decatur; Munir Cheryan, Urbana, all of Ill.

[73] Assignee: A.E. Staley Manufacturing Company, Decatur, Ill.

[21] Appl. No.: 595,380

[22] Filed: Feb. 1, 1996

[51] Int. Cl.$^6$ .................................................. A23J 1/14
[52] U.S. Cl. .................. 426/656; 426/478; 426/490; 426/629; 210/641; 210/650; 210/651; 210/653; 530/376; 530/414
[58] Field of Search ..................... 426/489, 490, 426/629, 656, 478; 210/641, 650, 651, 653; 530/376, 377, 414

[56] References Cited

U.S. PATENT DOCUMENTS

| | | | |
|---|---|---|---|
| 3,397,991 | 8/1968 | Johnson et al. .......................... | 426/656 |
| 3,995,071 | 11/1976 | Goodnight et al. .................. | 426/656 X |
| 4,018,752 | 4/1977 | Buhler et al. .......................... | 42/656 X |
| 4,088,795 | 5/1978 | Goodnight, Jr. et al. .......... | 426/656 X |
| 4,163,010 | 7/1979 | Garbutt .............................. | 426/656 X |
| 4,225,629 | 9/1980 | Saunders et al. .................... | 426/656 X |

FOREIGN PATENT DOCUMENTS

| | | |
|---|---|---|
| 0 176 621 A1 | 4/1986 | European Pat. Off. . |
| 0 452 238 A2 | 10/1991 | European Pat. Off. . |

OTHER PUBLICATIONS

PallSep VMF Dynamic Membrane Filter (Pall Corporation 1995).
Scepter Stainless Steel Membrane Systems, Proven Technology For The Most Challenging Separations (Graver Chemical Company 1996).
Mohr et al, Membrane Applications and Research in Food Processing, Chapter 5.3.1, pp. 104–110 (Noyes Data Corp 1989).
*Corn Wet Milled Feed Products*, Corn Refiners Association, Inc., 1989.
*Corn Gluten Feed and Gluten Meal*, Corn Industries Research Foundation, Inc., 1959.
May, *Wet Milling:* Process and Products, from Corn, edited by Stanley Watson, 1987.

*Primary Examiner*—Milton Cano
*Attorney, Agent, or Firm*—Arnold, White & Durkee

[57] ABSTRACT

An improved corn wet milling process is disclosed, in which gluten is recovered from steepwater by membrane filtration and is incorporated in a corn gluten meal product. The process can include the steps of steeping corn kernels in an aqueous solution, thereby producing steep water which contains gluten protein; membrane filtration of the steep water, thereby producing a retentate which has a higher concentration of the gluten protein than the original steep water; reducing the water content of the retentate; and incorporating the remaining retentate into a corn gluten meal product.

10 Claims, 13 Drawing Sheets

PROCESS FOR RECOVERY OF INSOLUBLE PROTEIN FROM STEEP WATER

BACKGROUND OF THE INVENTION

This invention relates to an improved wet milling process for refining corn into useful products, in which recovery and incorporation of gluten into more valuable end products is enhanced.

Corn kernels contain starch, protein, water, fiber, and other substances which can be separated to make various useful products. Gluten is one component of the kernel, and contains the majority of the protein that is present in corn, thus making it a desirable component for animal feed.

In order to refine the corn into end products such as starch, oil, and feed, a corn wet milling process is used. In general, kernels of corn are steeped in an aqueous solution under controlled conditions to soften the kernels and facilitate separation of the kernels' components. After steeping, the aqueous solution, referred to as steepwater, is drawn off. The corn kernel, swollen as a result of the steeping, is then coarse-milled to allow removal of the germ. Oil is removed from the germ and refined to make corn oil. The remainder of the germ is dried to form corn germ meal, or it may be used as an ingredient in corn gluten feed.

After the germ is removed, the remainder of the kernel is milled again to pulverize endosperm particles while leaving fibrous material nearly intact. Fiber is separated from the starch and gluten by screening. The fiber is then combined with the dried remains of the steepwater to make corn gluten feed.

The starch and gluten are then separated by their differences in density, for example in a centrifugal separator. The gluten is dried to form corn gluten meal. Some of the starch is dried and may optionally be chemically modified before being sold to the food, paper, or textile industries. Corn sweeteners or ethanol are produced from the remaining starch.

Thus two of the main animal feed products of the corn wet milling process are corn gluten feed and corn gluten meal. Corn gluten feed is a medium protein, medium energy product. It is used in feeds or concentrates for cattle, poultry, and swine. It is commonly sold containing about 20% protein. Corn gluten meal is a high protein, high energy product. It is a valuable source of methionine to complement other commonly used protein sources in animal feed. Also, its high xanthophyll content makes it particularly valuable as an efficient pigmenting ingredient in poultry feeds. It is a particularly excellent feed ingredient for cattle, because it provides a high level of rumen-protected protein.

Because of its superior characteristics as animal feed, corn gluten meal can be sold for a significantly higher price than corn gluten feed. Therefore, corn refiners prefer to maximize production of corn gluten meal relative to corn gluten feed. In a typical wet milling process, significant amounts of gluten remain in end products other than corn gluten meal. However, this type of protein is too small to be recovered by centrifugation or conventional filtration.

Microfiltration and nanofiltration are techniques that have been used in the past in some starch-related applications. For example, European patent application 0452238 A2 discloses using a nanofiltration membrane to filter a starch slurry, passing the dextrose in the slurry through the membrane while retaining the di-and trisaccharides, thereby producing a glucose syrup which is about 95% dextrose and 5% di- and trisaccharides. European patent application 0176621 A1 discloses a process for obtaining glucose from thinned starch. The process includes a separation step that produces a glucose-enriched stream and a glucose-depleted stream. Membrane-based separation is disclosed as one suitable separation technique.

A need exists for enhanced recovery of gluten in corn wet milling processes so that a higher percentage of the gluten that is initially present in the kernels can be included in the corn gluten meal product.

SUMMARY OF THE INVENTION

The present invention relates to an improvement in a corn wet milling process, in which corn kernels are steeped in an aqueous solution, and at least one process stream is produced which comprises gluten protein and water, for example steepwater. The end products of the process include a corn gluten feed and a corn gluten meal which has a higher protein content than the corn gluten feed. In one aspect of the invention, the aqueous process stream that comprises gluten protein is membrane filtered, thereby producing a retentate which has a higher concentration of the gluten protein than the original process stream. The gluten protein in the retentate is incorporated into the corn gluten meal.

The process can be applied to any aqueous stream in a corn wet milling process that contains a significant amount of high molecular weight protein (e.g. M.W. of at least 5,000). Examples of streams which can be used are steepwater and wash water from gluten thickening. The process can be performed in batch or continuous mode. The membrane filtration can suitably be microfiltration or ultrafiltration, or both types of filtration can be used sequentially, depending on the objective. For microfiltration, the preferred pore size of the membrane is between about $0.002\,\mu$ and $0.5\,\mu$. For ultrafiltration, the preferred molecular weight cutoff of the membrane is between about 5,000 and 500,000, most preferably between about 5,000 and 100,000. The microfiltration or ultrafiltration is preferably performed so as to produce a retentate having a dry solids concentration of at least 15% by weight, most preferably at least about 30% by weight. In a preferred embodiment of the process, the retentate is at least partially dried prior to being added to the corn gluten meal.

In one presently preferred embodiment of the invention, the membrane filtration is conducted by filtering the aqueous process stream using a spiral or ceramic membrane filter, thereby producing a first retentate, and filtering the first retentate using a spiral or ceramic membrane filter, thereby producing a second retentate. The first retentate in this embodiment can suitably be at least about 2 times more concentrated with respect to the gluten protein than the original aqueous process stream, and the second retentate can suitably be at least about 5 times more concentrated with respect to the gluten protein than the original aqueous process stream. In a particular embodiment of the invention, the first retentate is at least about 10 times more concentrated with respect to the gluten protein than the original aqueous process stream, and the second retentate can suitably be at least about 25 times more concentrated with respect to the gluten protein than the original aqueous process stream.

An especially preferred embodiment of the invention comprises a process for recovering gluten protein from steepwater in a corn wet milling process, and includes the steps of steeping corn kernels in an aqueous solution that comprises gluten wash water, thereby producing steepwater which contains gluten protein; microfiltering the steepwater with a filter membrane, thereby producing a retentate which has a higher concentration of the gluten protein than the original steepwater; reducing the water content of the retentate; and incorporating the remaining retentate into a corn gluten meal product.

Another embodiment of the process for recovering gluten protein from steep water in a corn wet milling process comprises steeping corn kernels in an aqueous solution, thereby producing steep water which contains gluten protein; microfiltering the steep water with a filter membrane, thereby producing a first retentate which has a higher concentration of the gluten protein than the original steep water; ultrafiltering the first retentate with a filter membrane, thereby producing a second retentate; reducing the water content of the second retentate; and incorporating the remaining second retentate into a corn gluten meal product.

Processes in accordance with the present invention have a number of benefits compared to prior art processes. Among those benefits are: (1) enhanced profitability by recovering meal-quality solids from steep water, to be included in higher-value products, (2) improved performance of steepwater evaporators due to removal of at least some protein and starch, resulting in less fouling of evaporator heat exchangers, and (3) reduced cost of drying corn gluten feed, since it should be possible to obtain higher solids in the concentrated steep water due to removal of protein and starch.

DETAILED DESCRIPTION OF THE INVENTION

It should be recognized that the following description of specific embodiments of the present invention is not intended to be a complete list of every possible embodiment of the invention. Persons skilled in this field will recognize that modifications can be made to the specific embodiments described here that would be within the scope of the present invention.

Any portion of the processing not expressly discussed in this patent would be generally like previously known corn wet milling processes, for example as described in Corn Wet Milled Feed Products (Corn Refiners Association 1989).

Figure 1:
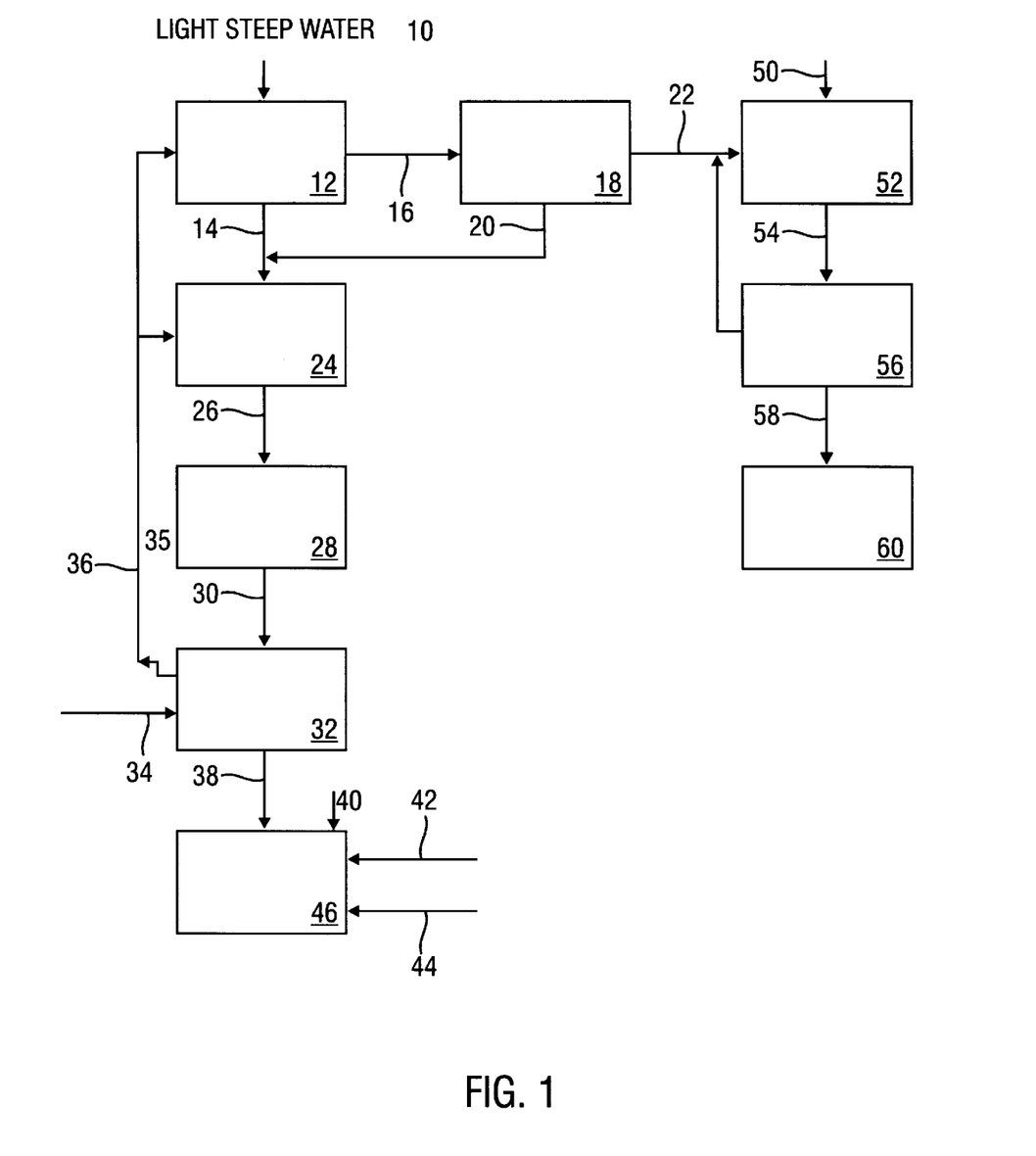
FIG. 1 is a process flow diagram of one embodiment of the present invention.

One embodiment of the present invention is shown in FIG. 1. The process takes a light steep water stream 10 and subjects it to microfiltration. The light steep water 10 might have, for example, a solids concentration of 11% DS. The steep water 10 is initially filtered through a first filter 12, which in a preferred embodiment comprises a spiral-wound microfiltration membrane. This filtration step produces a first permeate 14 and a first retentate 16, with the retentate containing a higher concentration of gluten than the permeate. The first retentate 16 is then subjected to a second filtration step, preferably through a ceramic microfiltration membrane 18. This second filtration step produces a second permeate 20 and a second retentate 22, with the retentate again being richer in gluten than the permeate.

Suitable membrane filters for use in the process of the present invention include spiral wound filters available from Koch, AMT, Osmonics, and DeSal, and ceramic filters from US Filter, Tech-Sep, and CeraMem. A spiral wound filter membrane can be used in either the first or second step of a two-step filtration process, depending on the economics and/or availability of the membranes.

The first permeate 14 and the second permeate 20 are then combined, forming an aqueous stream that might typically have 10% DS. This combined permeate is then evaporated in a double effect evaporator 24. The more concentrated steep water produced by this evaporation (having, for example, 30% DS) can be further concentrated (for example, to 50% DS) by a triple effect evaporator 28, in which steam 35 is injected. The concentrated steep water stream 30 is then further dewatered in a steam tube dryer 32, in which live steam 34 is injected. The vapor 36 from the dryer produced in this step (or steam) can be recycled to the first filter 12 and to the double effect evaporator 24.

The concentrated steep water 38 is then combined with fiber 40, germ residue 42, and refinery mud 44 (i.e., the residue left after clarification of corn syrup) to produce corn gluten feed 46. The amount of this product could be, for example, approximately 10.8 lb. DS per bushel of corn milled.

The second retentate 22, containing the majority of the gluten from the steep water, is then combined with a wet gluten cake 50 in a mixer 52. The wet gluten cake (typically about 40% DS) will typically come from a centrifugal separator (not shown) which separates starch from gluten after milling. The combined gluten-rich stream 54 is then dried in a gluten dryer 56, with the removed water being recycled into the second retentate 22. The concentrated gluten stream 58 can then be sold as corn gluten meal 60. The amount of this product 60 might be approximately 3 lb. DS per bushel of corn milled.

As mentioned above, many modifications could be made to this particular embodiment of the invention. For instance, it is not necessary to have multiple stage filtration, although in some circumstances it might be desirable.

gallon drum of steepwater would be lost as the "filter cake" on this prefilter.

Total solids was done by gravimetric analysis (oven drying and by infra-red drying). Nitrogen was determined by Kjeldahl. Non-protein nitrogen (NPN) was determined as nitrogen soluble in 2% trichloroacetic acid (TCA). Starch was determined by the enzymatic method: the complete hydrolysis of starch by ($\alpha$-amylase and glucoamylase under standard conditions. The resulting dextrose was determined by HPLC on a BioRad HP-87X column, and the starch calculated as dextrose/1.11.

Results

Six batch recycle runs and one feed-and-bleed run (feed into the system and remove the permeate continuously) were performed, each with slightly different objectives. A summary of the experimental conditions and results for MF are shown in Table 1. Not shown in Table 1 is one ultrafiltration (UF) study, where the permeate from the MF was sent through a 5000 MWCO UF spiral module to possibly recover more solids.

TABLE 1

Summary of steepwater trials.
[TS = total solids, N = total nitrogen, S = starch, TMP = transmembrane pressure, J = flux, (i) = initial value, e.g., in feed, (f) = final value, e.g., at the highest X value, R = retentate concentration, P = permeate concentration]

| Run # | Osmonics (X-value) | CeraMem (X-value) | TS(i) (%) | TS(f) % | N(i) % | N(f) % | S(i) % | S(f) % | TMP (psi) | J(i) GFD | J(f) GFD | J(ave) GFD |
|---|---|---|---|---|---|---|---|---|---|---|---|---|
| 7-21 | 10X | | 11.4 | R = 21.3 P = 11.5 | | | | | 15 | 16 | 6 | 10 |
| | | 19X | 11 | R = 18.8 P = 10.1 | | | | | 25 | 55 | 23 | 30 |
| 8-5 | 24X | | 11.6 | R = 28.3 P = 14.3 | 0.81 | R = 3.2 P = 1.05 | 0.65 | R = 1.14 P = 0 | 15 | 20 | 3 | 4 |
| 9-8 | 25X | | 13 | R = 29.0 P = 12.0 | 0.92 | R = 2.2 P = 1.02 | 0.42 | R = 4.45 P = 0 | 15 35 | 17.3 16.5 | 7.31 7.5 | 10 |
| 10-5 | 25X | | 10.2 | R = 28.4 P = 12.1 | 0.88 | R = 2.7 P = 1.11 | | | 15 | 24 | 4 | 8 |
| | | 25X to 44X | | R = 35.5 P = 15.8 | | R = 3.2 P = 1.6 | | | 25 | 7.6 | 0.6 | 2 |
| 10-13 | 10X (Feed & Bleed) | | 9.6 | R = 14.5 P = 8.0 | | | | | 15 | 20 | 6 | 7 |

EXAMPLE

Methods

Trials were conducted with an Osmonics HZ20 spiral-wound membrane, and with a Dow/CeraMem/US Filter system. The latter comprised three cross-flow microfilters installed in parallel so they could be tested individually: a CeraMem ceramic filter (id=2 mm, pores=0.2$\mu$, area=0.14 m$^2$), a US Filter/Membralox ceramic filter (id =4 mm, pores=0.5$\mu$, area=0.2 m$^2$), and a Dow CMF capillary module filter (id=3 mm, pores=0.2$\mu$, area=0.74 m$^2$). A pre-filter (Ronningen-Petter containing a 250-mesh screen) was also used. The steepwater was first pumped through the prefilter and the filtrate used in the microfiltration (MF) systems. Typically, the filter would retain broken corn kernels and large dark particles. Less than about 0.2 gallons per 55 gallon drum of steepwater would be lost as the "filter cake" on this prefilter.

All runs were done at 140° F., except Run #7-21, which was at 120° F. Run #7-21 was done in spiral and ceramic systems separately, each starting with fresh steepwater. Run #10-5 was done consecutively: the steepwater was first microfiltered in the spiral unit to 25X, and then the 25X retentate was transferred to the ceramic system and processed to 44X. Not shown: Run 9-15 which was conducted at 180° F., and the UF trial.

The steepwater used was highly variable over the period these tests were conducted, ranging from 9.6% TS to 13% TS. Sometimes the steepwater would smell strongly of ethanol. In HPLC analysis of the steepwater from Run #10-15, a large peak at 10.616 minutes was lactic acid (about 2%), and a peak at 16.266 was ethanol (about 0.83%). The other peaks were unidentified.

Figure 2:
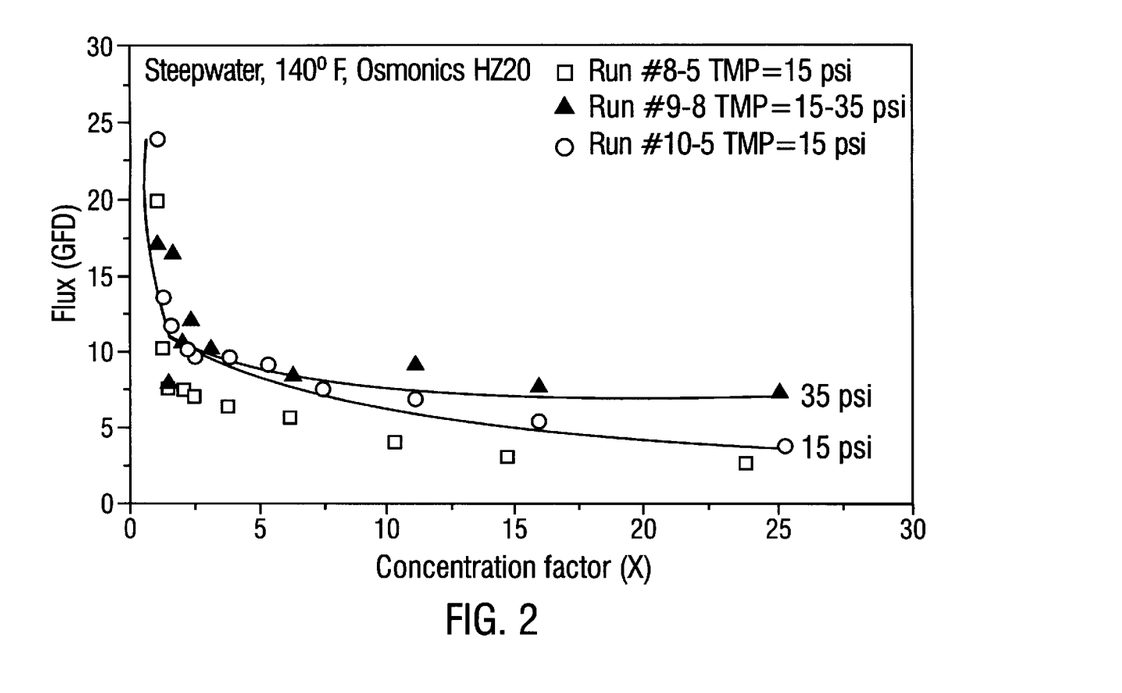
FIG. 2 is a graph summarizing the flux data obtained in batch tests using a spiral membrane. (□Run #8-5, TMP=15 psi; ▲Run #9-8, TMP=15–35 psi; ○Run #10-5, TMP=15 psi; Run #9-8 was operated at 15 psi until 1.59X, then increased to 35 psi.)

FIG. 2 is a summary of the flux data obtained with the spiral membrane. The typical steep decline in flux was observed for the first 3–5 hours, followed by a relatively steady flux. Some of the differences could be due to the feed, e.g., Run #10-5 had only 10.2% TS in the feed, and gave slightly higher flux than the other two, which had 11.6 and 13% TS in the feed. Note that Run #9-8 (13% TS) was also showing rapid fouling initially. At X=1.59, the TMP was increased from 15 psi to 35 psi, which explains the higher average flux for this trial.

Figure 3:
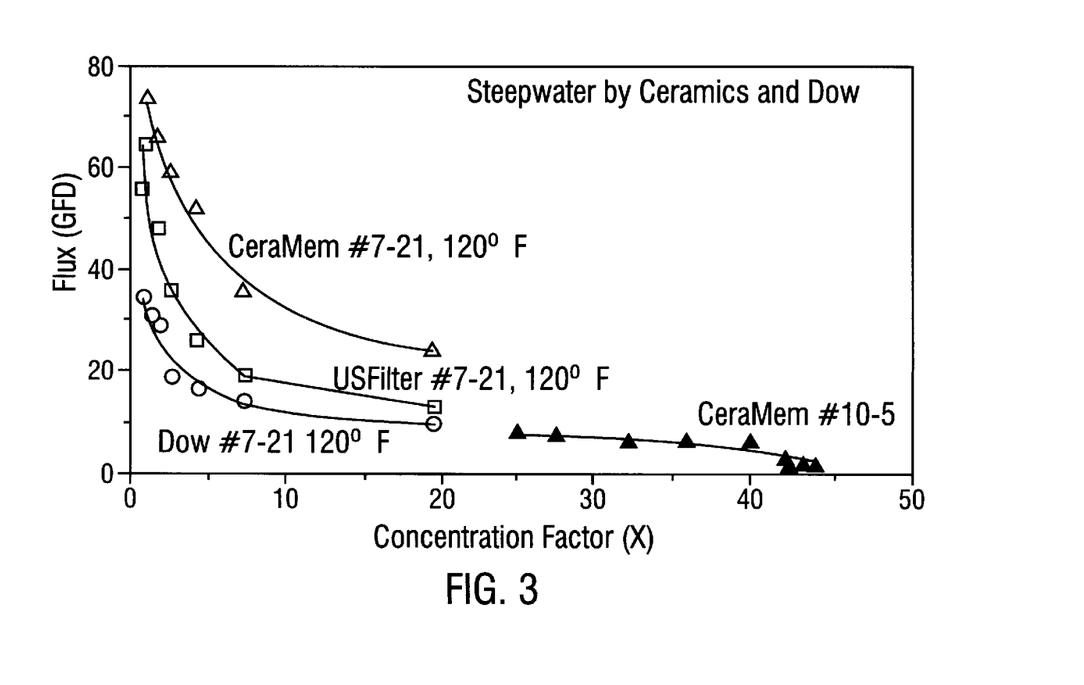
FIG. 3 is a graph that summarizes similar data obtained in batch tests using ceramic filter membranes. (△#7-21, CeraMem, 120° F.; □#7-21, US Filter, 120° F.; ○#7-21, Dow, 120° F.; ▲#10-5, CeraMem; the CeraMem run #10-5 used 25X feed from the spiral unit; the other runs used 1X (fresh) steepwater.)

FIG. 3 shows the data with the ceramic membranes. Average flux for 20X with the CeraMem membrane was three times higher than the spiral (partly due to higher TMP). The US Filter and Dow membranes did not perform as well. FIG. 3 also shows Run #10-5 which used 25X retentate from the spiral membrane. Its flux was much lower than expected.

Figure 4:
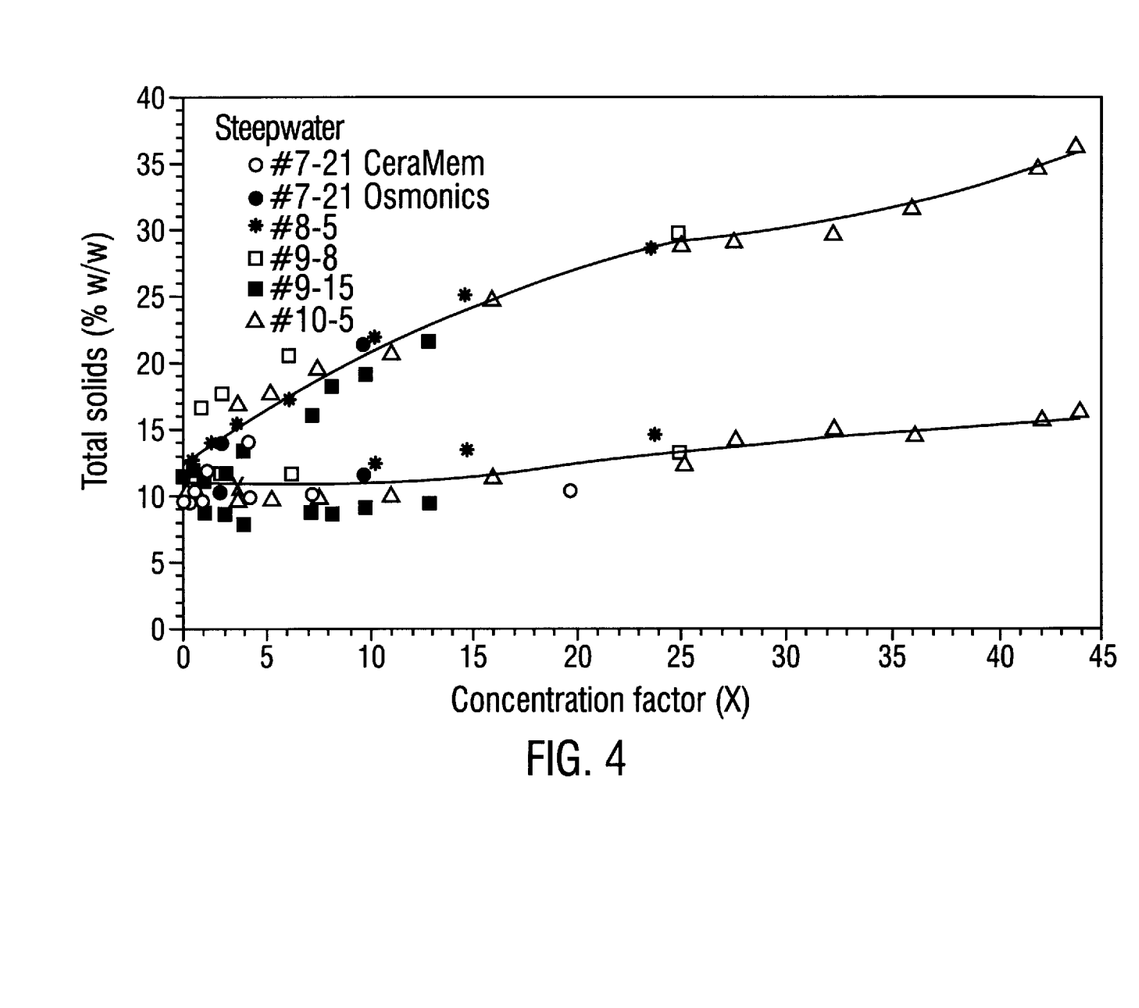
FIG. 4 is a graph showing the change in total solids at different values of X during microfiltration of steepwater. (○#7-21, CeraMem; ●#7-21, Osmonics; * #8-5; □#9-8; ■#9-15; △#10-5.)

FIG. 4 shows changes in total solids during MF of steepwater. All the data obtained with steepwater is shown in this figure. The average TS in the feed (12%) doubled to 24% TS at 15X, but then only increased to 35% TS at 44X. On the other hand, the TS in the permeate should have remained essentially constant (in theory). However, there was an increase in permeate solids with X (9.5% to 11% up to 15X), becoming much higher above 25X (12–15% TS). Thus there seems to be a substantial amount of passage through the membrane, possibly due to diffusion of soluble components.

Figure 5:
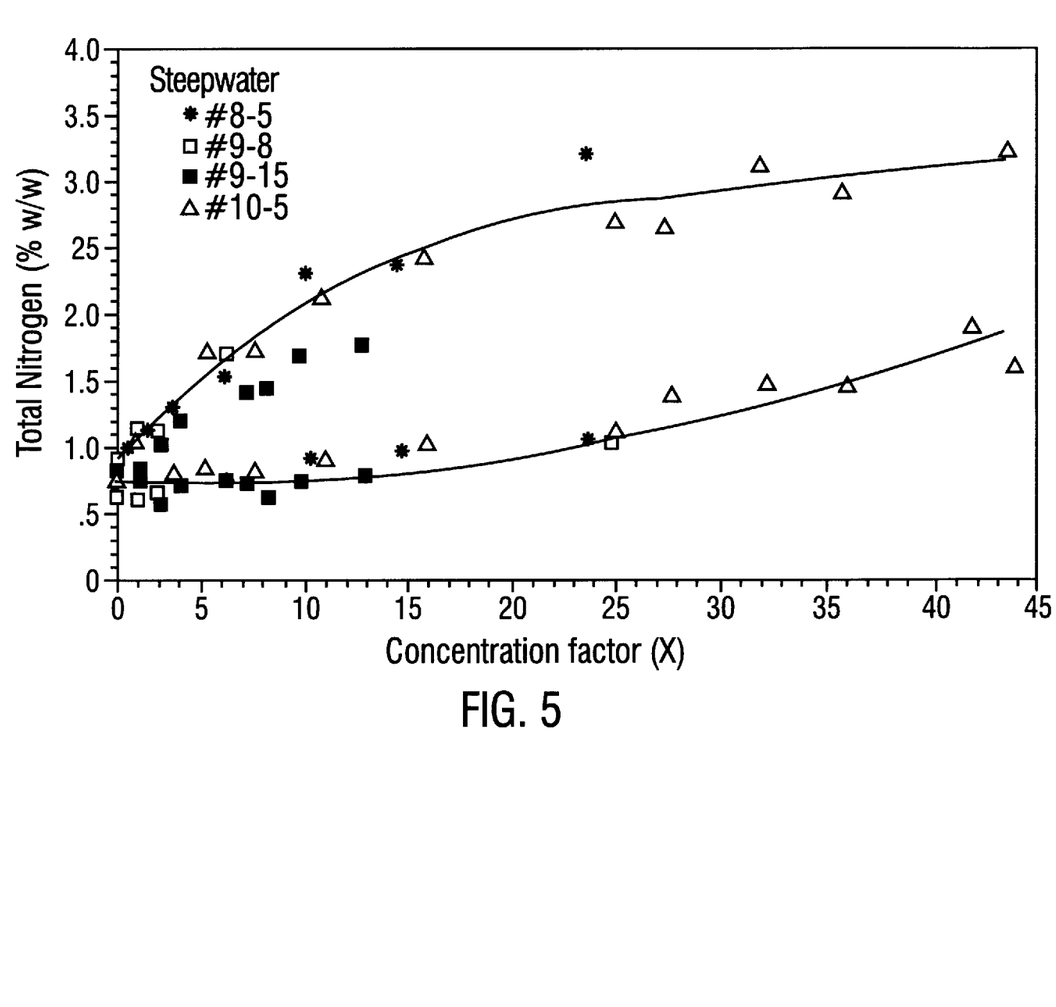
FIG. 5 is a graph showing the effect of X on total nitrogen in the retentate and permeate. (* #8-5; □#9-8; ■#9-15; △#10-5.)

This is also shown in FIG. 5. The total nitrogen in the retentate increased from ~0.9% to 2.5% at 15X, but then the rate of increase seemed to level off, increasing only to 3.2% N at 44X (equivalent to a protein concentration of 20%). This suggests greatly increased losses of nitrogen in the permeate. At high X values, nitrogen concentration increased from 0.75% to 1.8% between 15X and 44X.

Figure 6:
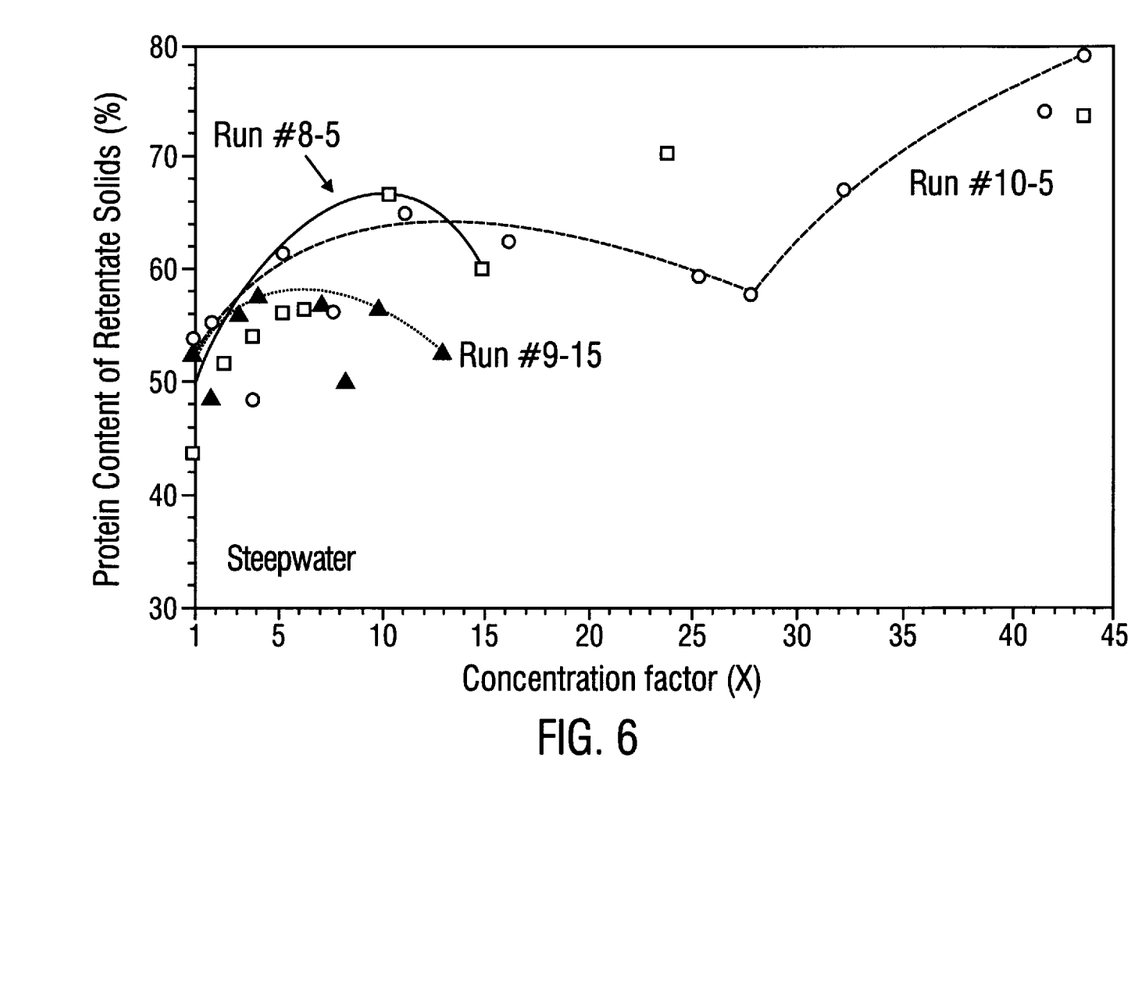
FIG. 6 shows the protein content of retentate solids as a function of X. (□#8-5; ○#10-5; ▲#9-15.)

The significance of this is shown in FIG. 6, which plots the protein content (calculated as N×6.25) of the retentate solids vs. X. The steepwater's protein content varies from 42–53% (dry basis). It increases with X, due to the removal of permeable compounds (lactic acid, ethanol, salts, sugars, etc.) and nonprotein nitrogen compounds (amino acids, etc.) during MF. However, it is also observed that with the spiral-wound runs (up to 25X), there appears to be a maximum in the protein content of 58–67% (d.b.) at X values of 7–12. This is due to an increase in the passage of nitrogen in to the permeate at higher values of X (FIG. 5). The nitrogen that passes into the permeate is all nonprotein nitrogen (NPN), and should not have caused this maximum effect seen in FIG. 6. However, this could be because the NPN was not accounted for in the calculations of "protein content", which was calculated as total nitrogen (TN)×6.25. In fact, true protein should actually be calculated as True Protein (%)=(TN-NPN)×6.25

The nitrogen distribution is shown in detail later for each run.

When the retentate from the spiral run of Run #10-5 was re-processed in the ceramic system, the protein content reached 78% (d.b.) at very high values of X (FIG. 6).

Figure 7:
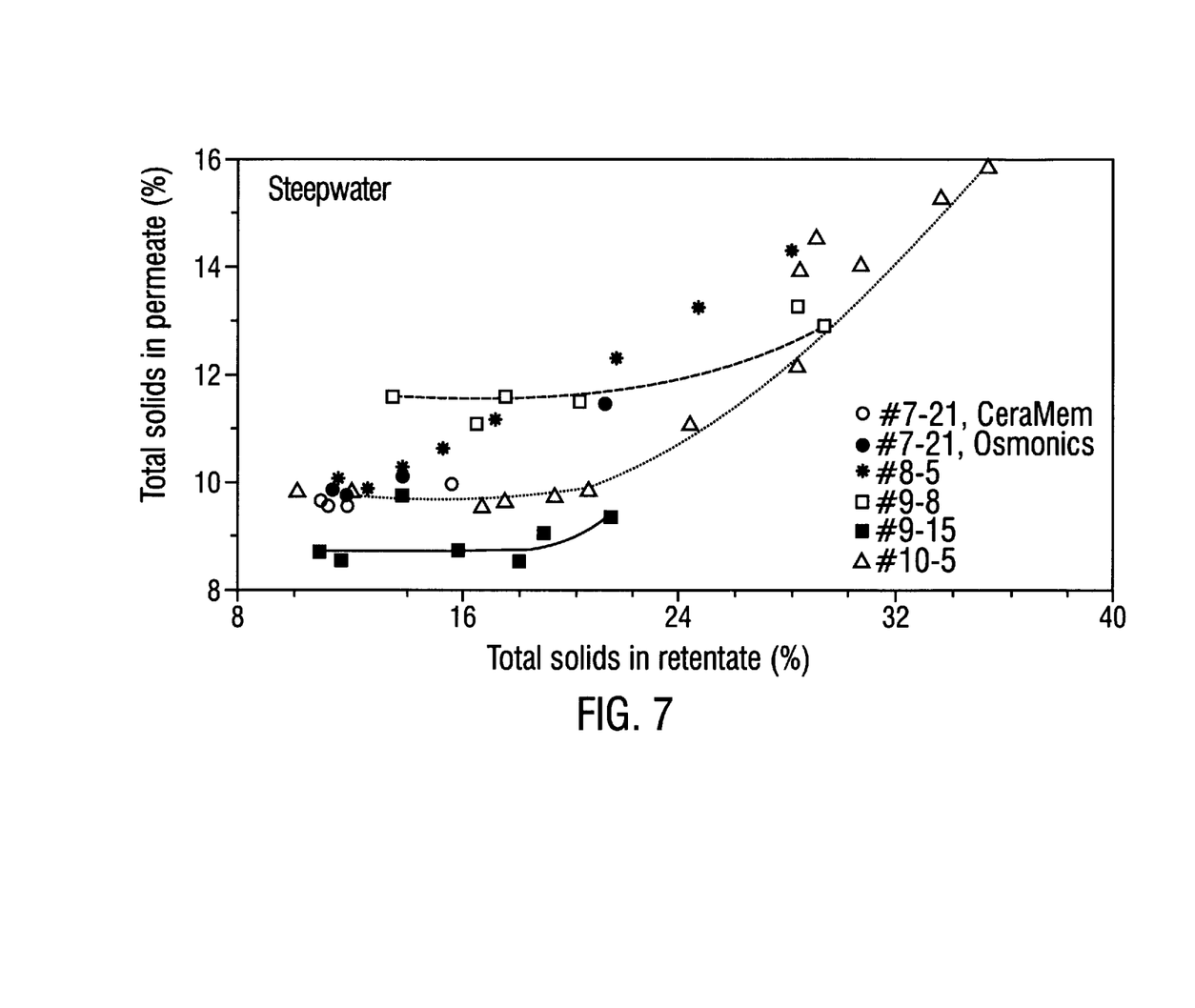
FIG. 7 shows the effect of retentate total solids on permeate TS. (○#7-21, CeraMem; ●#7-21, Osmonics; * #8-5; □#9-8; ■#9-15; △#10-5.)
Figure 8:
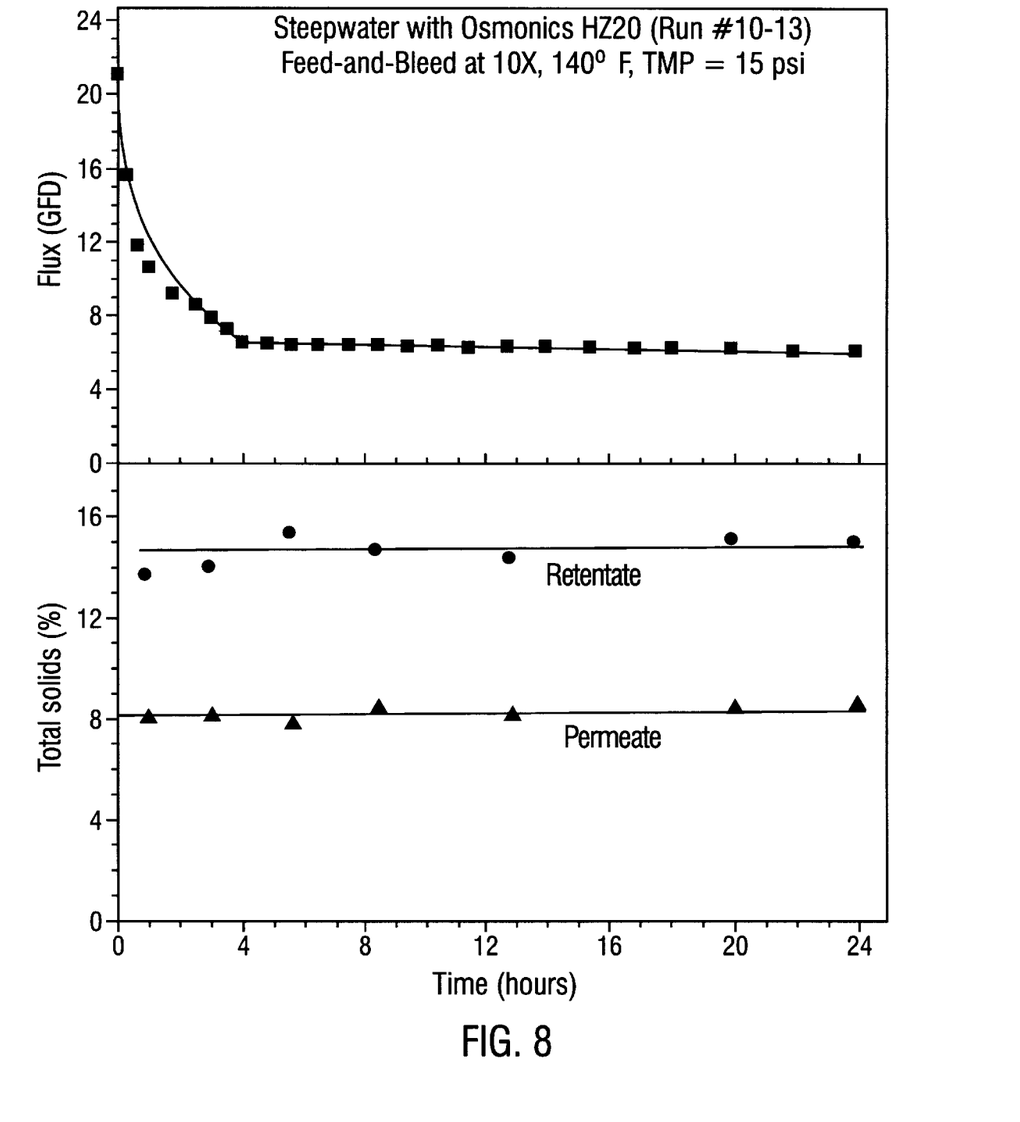
FIG. 8 shows the change in flux and TS over time in a feed-and-bleed run (#10-13) with a spiral wound filter membrane. (Steepwater with Osmonics HZ20, run #10-13, feed and bleed at 10X, 140° F., TMP=15 psi; ■flux; ●retentate total solids; ▲permeate TS.)

The solids concentration in the permeate is dependent on the solids in the feed, as shown in FIG. 7. The correlation is different for each run, but some interesting trends can be seen. For all except Run #8-5, the TS in the permeate remains more or less constant until the TS in the permeate reaches 19–20% TS (equivalent to 10X, as shown in FIG. 4). The permeate TS then starts increasing. Run #8-5 shows a steady increase in permeate TS as retentate TS increases. One way to reduce the loss of solids into the permeate is to use a tighter membrane, but this results in a dramatic loss in flux (data not shown.) FIG. 8 shows the feed-and-bleed run (#10-13) with the Osmonics spiral wound membrane at~10X. The initial flux was 22 GFD, which decreased to 7 GFD under these operating conditions (140° F., 15 psi) within 4 hours, but remained quite steady for the next 20 hours. We expect that the average steady-state flux can be increased if the TMP is increased in a gradual manner during the run, as suggested by the pressure excursion data shown later in FIG. 9.

Also shown in the bottom portion of FIG. 8 is the TS of the retentate and permeate, which also remained steady throughout the trial at 14.5% and 8.0% respectively. This checks with earlier batch recycle data, although the permeate TS is slightly lower than expected even after accounting for the low steepwater TS of 9.6%.

The feed (1X), 25X retentate and the permeate were sampled and visually examined during MF with the Osmonics HZ20 spiral wound membrane. The retentate foams strongly and the trapped air makes pumping difficult, especially at high protein levels.

Effect Of Pressure And Flow Rate On Flux

Figure 9:
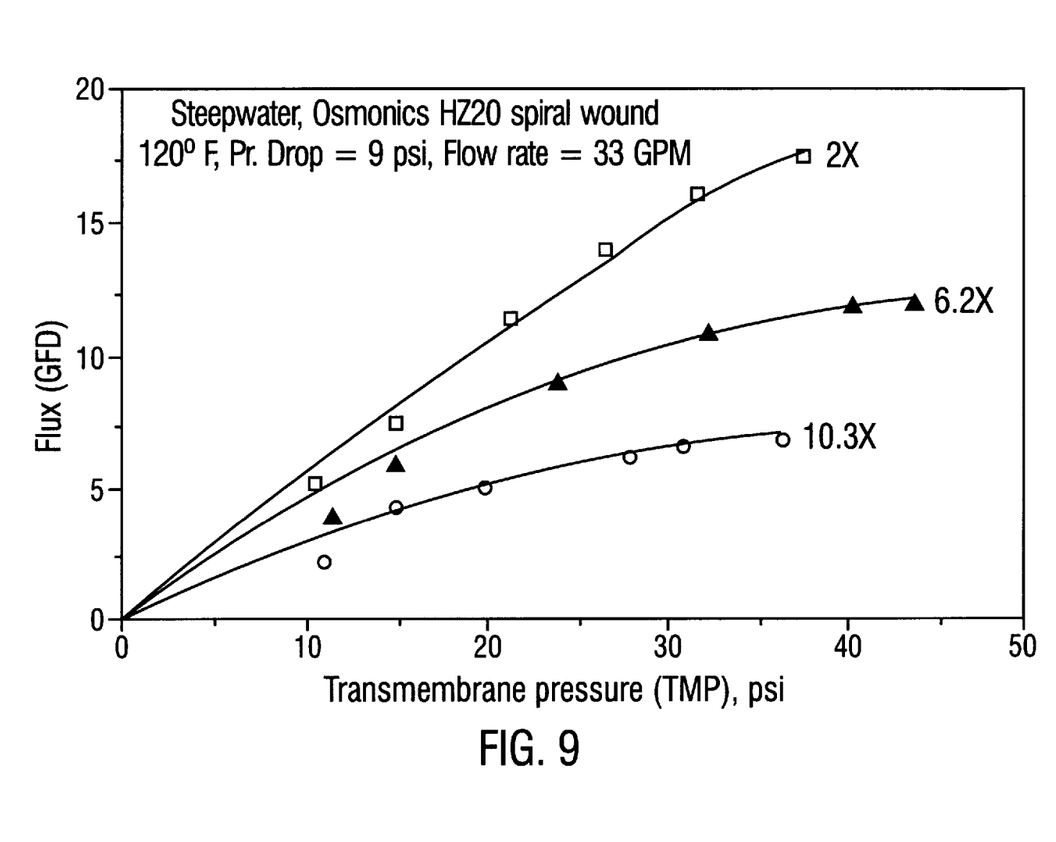
FIG. 9 shows the effect of transmembrane pressure (TMP) on flux at various values of X. This data was taken during run #8-5. (Steepwater, Osmonics HZ20 spiral wound filter, 120° F., pressure drop=9 psi, flow rate=33 gpm; □2X; ▲6.2X; ○10.3X.)

FIG. 9 shows the effect of transmembrane pressure on flux. The data were obtained at various X values as shown, and the pressure drop was maintained at 8–10 psi during these experiments. The benefit of operating at higher pressures can be seen. For example, at 2X the flux at 15 psi was 8 GFD, but increases to 17 GFD at 35 psi. At 10.3X, the flux increases from 3.5 GFD to 6.5 GFD.

Figure 10:
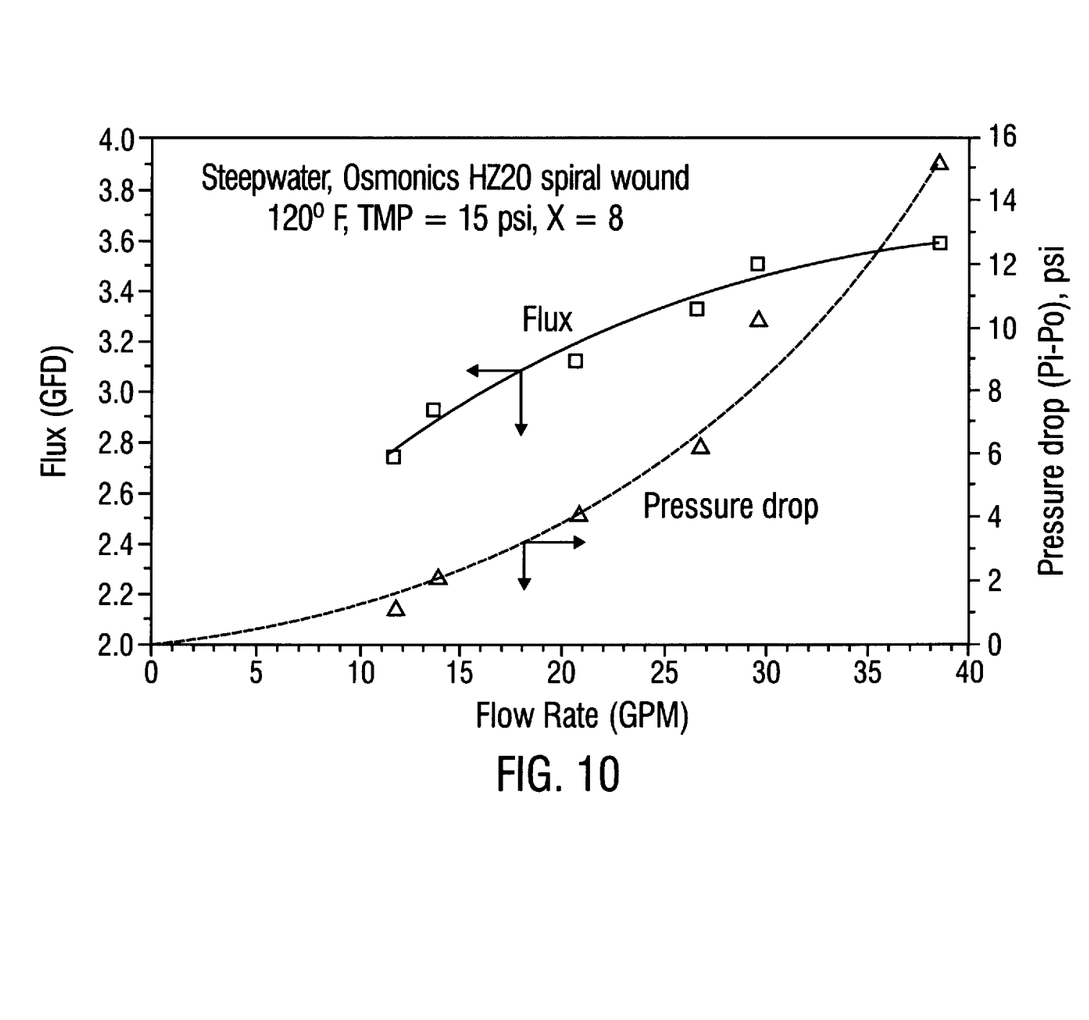
FIG. 10 shows the effect of cross flow rate on flux. This data was obtained at 8X. (Steepwater, Osmonics HZ20 spiral wound filter, 120° F., TMP=15 psi; □flux; △pressure drop.)

FIG. 10 shows the effect of cross flow rate on flux at 8X. Increasing flow rate from 12 GPM to 39 GPM (which means increasing pressure drop from 1 psi to 15 psi) increases flux from 2.7 GFD to 3.6 GFD. However, it is not advisable to use such high flow rates since the benefit may not be worth the cost. For example, the energy consumption per unit of flux is much higher at high flow rates than at low flow rates. At the same time, the capital expense due to lower flux increases by a smaller factor. The actual cost of electric power vs. membrane replacement cost will have to be factored in to determine the optimum flow rate.

Distribution Of Steepwater Components During MF

Figure 11:
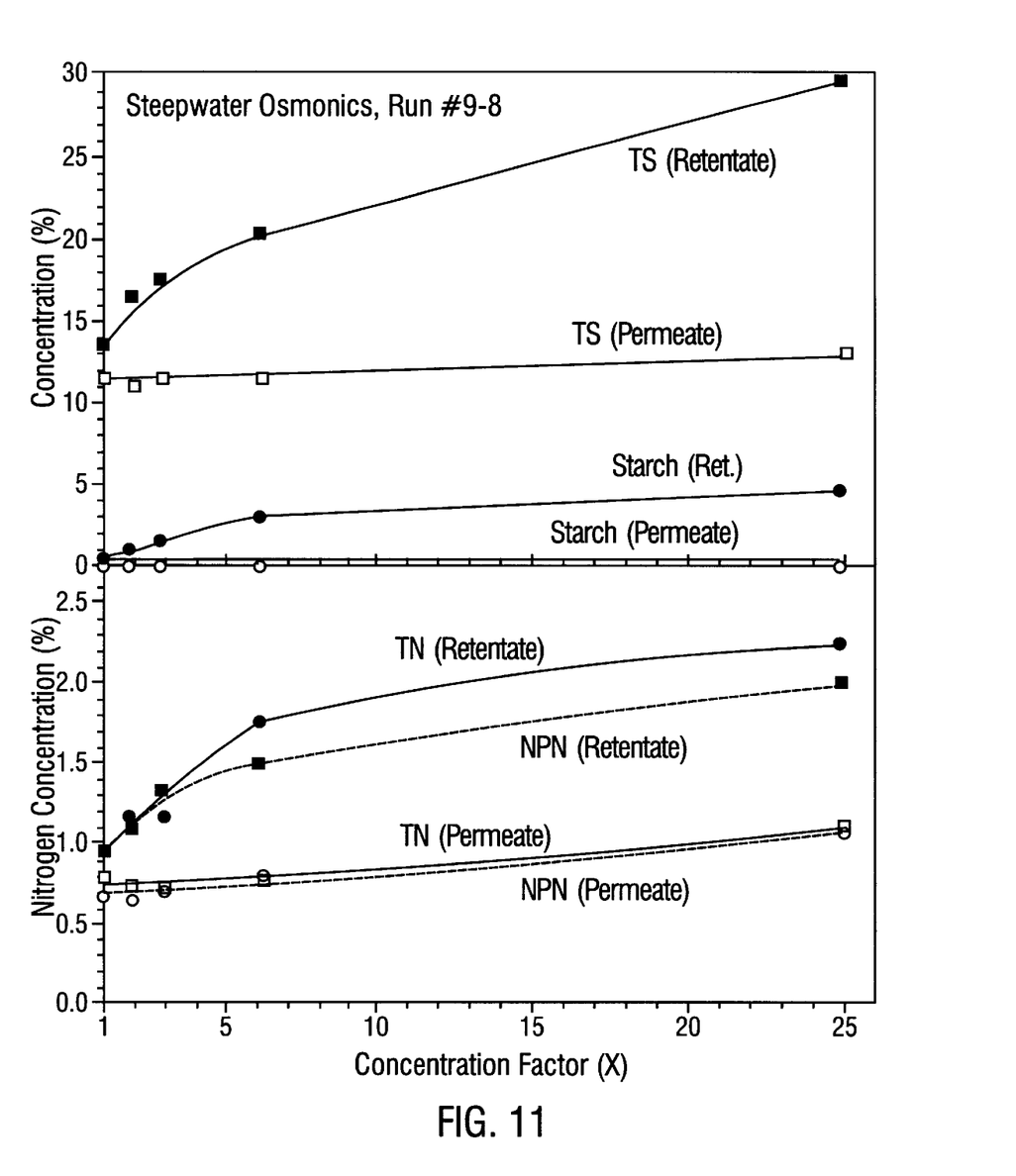
FIGS. 11, 12, and 13 show the distribution of steepwater components during microfiltration runs #9-8, 10-5, and 8-5, respectively, using the Osmonics filter in each instance. (Top portion of graph: ■retentate TS; □permeate TS; ●retentate starch; ○permeate starch. Bottom portion of graph: ●retentate TN; ■retentate NPN; □permeate NPN; ○permeate TN.)

FIG. 11 shows the distribution of the solids, nitrogen and starch. The starch was completely rejected by the membrane (no starch was observed in the permeate in any run). However, starch concentration did not increase in proportion to X, as would be expected for a completely rejected solute. We suspect some of the starch firmly gelled on the membrane surface. On a continuous feed-and-bleed system, this should not amount to a large loss, since the volume processed in relation to membrane area is much larger than in these tests.

The major point to note in FIG. 11 is that at 1X (the feed), a substantial portion of the "protein" in the steepwater is actually non-protein nitrogen (NPN). This confirms literature data (Christianson, D. D., J. F. Cavins, and J. S. Wall. 1965. Identification and determination of nonprotein nitrogenous substances in corn steep liquor. J. Agr. Food Chem. 13: 277–280) that over 90% of the "protein" in steepwater is NPN. In addition, all the nitrogen in the permeate was soluble in 2% TCA, indicating there was no true protein in the permeate (at least, as defined by the 2% TCA test). Thus the true protein was completely rejected by the membrane. However, in theory, the NPN in the retentate should not have increased as shown in FIG. 11, since it was supposed to be freely permeable. The reason for this is unknown, except perhaps that the 2% TCA is not strong enough to precipitate all the proteins.

Figure 12:
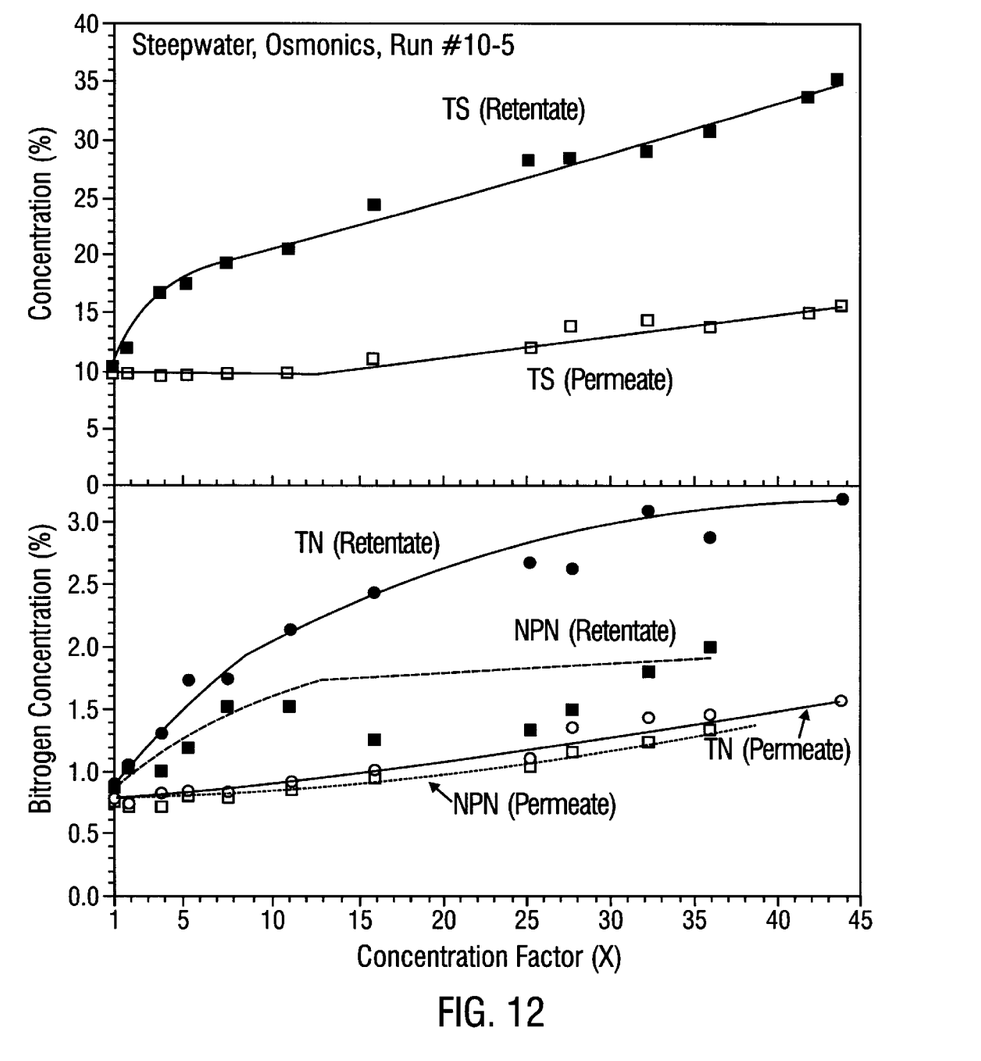
Figure 13:
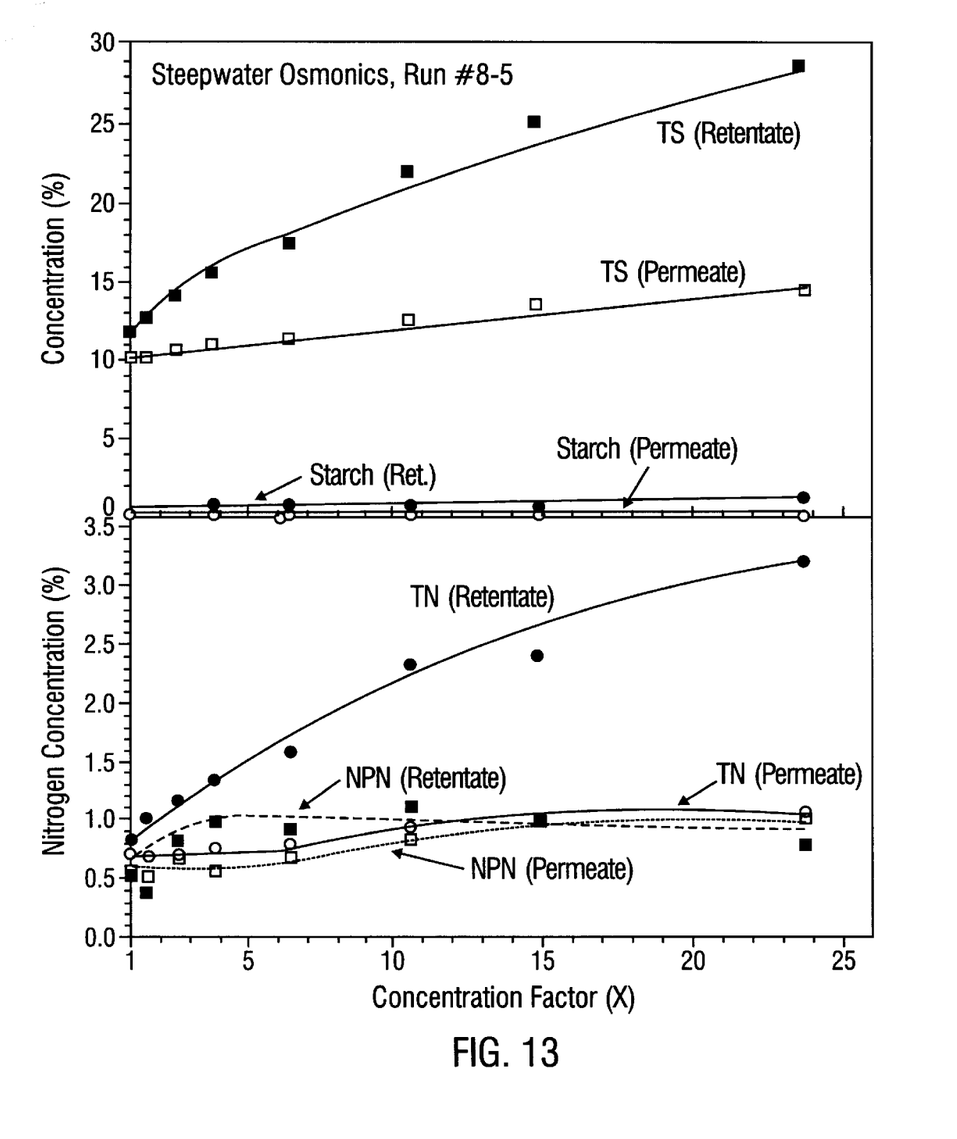

FIGS. 12 and 13 show similar distribution data for other runs. The scatter in the NPN (retentate) data is probably a reflection of the inadequacy of the 2% TCA test to properly measure NPN.

Figure 14:
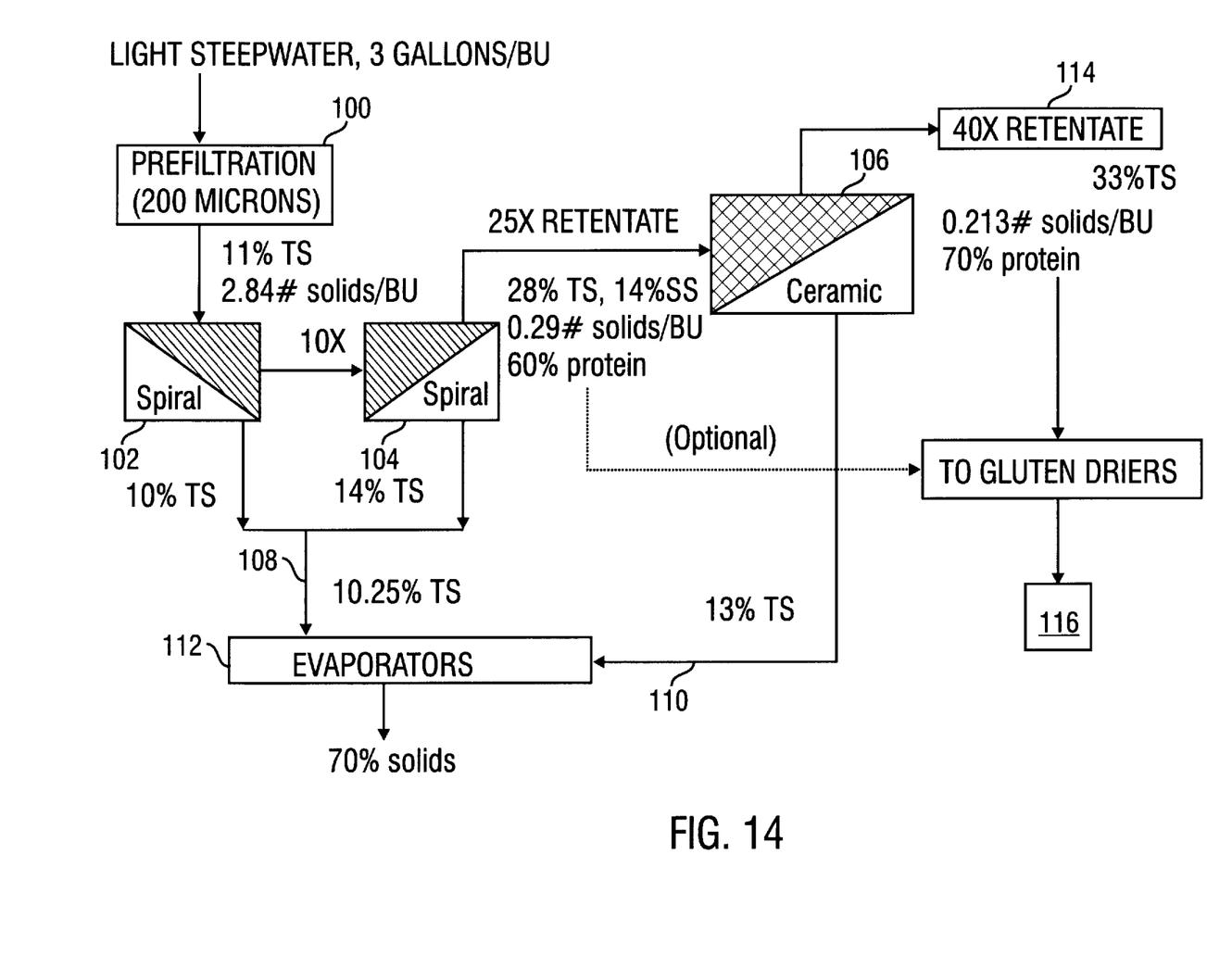
FIG. 14 is a proposed flowsheet for one embodiment of the present invention, in which MF membranes are incorporated into a steepwater line in a corn wet milling plant.

FIG. 14 shows a suggested flowsheet for incorporation MF membranes in an existing plant, where the steepwater has 11% TS. The added value of the recovered steep solids is the difference between the gluten meal and the feed prices, approximately $(0.14–0.05)=$0.09/lb.

Following prefiltration 100, the first stage of the membrane system consists of spiral membranes 102 and 104 operating at 140° F. in two (or more) feed-and-bleed loops to 25X, followed by an optional second stage with a ceramic membrane 106 going from 25X to 40X. The mixed permeate 108 and 110 from all spirals and ceramic stages will have 10.4% TS, which will go to evaporators 112. It is expected that since we have removed suspended matter (primarily macromolecules that result in high viscosity at high concentrations), the steep evaporators should be able to go to higher TS, perhaps as high as 70% TS, thus providing additional savings in the feed drying operations. The 40X retentate 114 is sent to gluten dryers 116.

The retentate from the spirals at 25X will have 28–30% TS. The solids will be at about 60% protein (dry basis), good enough to be added to the higher-value gluten meal. If this retentate is further microfiltered, the retentate will be at 33–35% TS. There would be some solids loss in the permeate. However, the protein content of the solids is now higher: ~70% protein (dry basis).

For the first stage, even though the ceramic membrane gives higher flux, the capital cost for the spiral system is much less. For the optional second stage, ceramics are preferably used.

The following must be considered in any economic analysis: There are additional savings in corn gluten feed drying due to higher solids leaving the steepwater evaporators. The higher solids (70% TS vs. 50% TS) is due to the removal of suspended matter from the steep liquor, thus lowering the viscosity and reducing fouling of the evaporators. Additional expense is involved in drying the retentates from 35% TS (for the 40X spiral+ceramic system) or from 28% TS (for the 25X spiral system) to the 40% TS level of the gluten driers. The additional drying cost will also be a factor in determining the optimum X level in the membrane system, since removal of water by the membrane is cheaper than by drying. However, this must be balanced against the loss of solids in the membrane system.

One preferred implementation of the process is to do the MF to 25X with spiral filters, then send the retentate to an evaporator to bring it up to 50% TS, then mix it with the gluten meal for drying. The heat required for evaporation can come from the additional vapor generated in the gluten drier. In this manner, the solids recovery is better, the quality is acceptable (60% protein, d.b.), and the additional cost of drying the steep retentate solids is reduced.

We claim:

1. In a corn wet milling process, in which corn kernels are steeped in an aqueous solution which comprises gluten wash water thereby producing steep water and in which the end products of the process include a corn gluten feed and a corn gluten meat which has a higher protein content than the corn gluten feed, the improvement comprising the steps of:

membrane filtrating said steep water that comprises gluten wash water and insoluble gluten protein, thereby producing a retentate which has a higher concentration of the insoluble gluten protein than the steep water; and incorporating the insoluble gluten protein in the retentate into the corn gluten meal.

2. The process of claim 1, where the aqueous process stream that is membrane filtered is a gluten wash water stream.

3. The process of claim 1, where the retentate is at least partially dried prior to being added to the corn gluten meal.

4. The process of claim 1, where the filtration is performed using a microfiltration membrane that has a pore size between about $0.002\mu$ and $0.5\mu$.

5. The process of claim 1, where the filtration is performed using an ultrafiltration membrane that has a molecular weight cutoff between about 5,000 and 500,000.

6. The process of claim 1, where the membrane filtration is conducted by filtering the aqueous process stream using a spiral or ceramic membrane filter, thereby producing a first retentate, and filtering the first retentate using a spiral or ceramic membrane filter, thereby producing a second retentate.

7. The process of claim 6, where the first retentate is at least about 2 times more concentrated with respect to the gluten protein than the aqueous process stream, and where the second retentate is at least about 5 times more concentrated with respect to the gluten protein than the aqueous process stream.

8. The process of claim 1, where the membrane filtration is performed so as to produce a retentate having a dry solids concentration of at least 30% by weight.

9. process for recovering insoluble gluten protein from steep water in a corn wet milling process, comprising the steps of:

steeping corn kernels in an aqueous solution that comprises gluten wash water, thereby producing steep water which contains insoluble gluten protein;

membrane filtration of the steep water, thereby producing a retentate which has a higher concentration of the insoluble gluten protein than the original steep water;

reducing the water content of the retentate; and incorporating the remaining retentate into a corn gluten meal product.

10. A process for recovering insoluble gluten protein from steep water in a corn wet milling process, comprising the steps of:

steeping corn kernels in an aqueous solution that comprises gluten wash water, thereby producing steep water which contains insoluble gluten protein;

microfiltering the steep water with a filter membrane, thereby producing a first retentate which has a higher concentration of the insoluble gluten protein than the original steep water;

ultrafiltering the first retentate with a filter membrane, thereby producing a second retentate;

reducing the water content of the second retentate; and incorporating the remaining second retentate into a corn gluten meal product.

* * * * *

UNITED STATES PATENT AND TRADEMARK OFFICE
CERTIFICATE OF CORRECTION

PATENT NO.    :   5,773,076

DATED         :   June 30, 1998

INVENTOR(S)   :   Liaw et al.

It is certified that error appears in the above-identified patent and that said Letters Patent is hereby corrected as shown below:

Column 9, line 64 (claim 1), delete "meat" and insert therefor --meal--.

Column 10, line 35 (claim 9), before "process" insert --A --.

Signed and Sealed this

Thirteenth Day of October 1998

*Attest:*

BRUCE LEHMAN

*Attesting Officer*    Commissioner of Patents and Trademarks